United States Patent
Ittel

(10) Patent No.: US 7,291,292 B2
(45) Date of Patent: Nov. 6, 2007

(54) PREPARATION OF SILVER PARTICLES USING THERMOMORPHIC POLYMERS

(75) Inventor: Steven Dale Ittel, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 243 days.

(21) Appl. No.: 11/212,145

(22) Filed: Aug. 26, 2005

(65) Prior Publication Data

US 2007/0045589 A1    Mar. 1, 2007

(51) Int. Cl.
*H01B 1/00* (2006.01)
*H01B 1/02* (2006.01)
*H01B 1/12* (2006.01)
*C01G 3/00* (2006.01)
*C01G 5/00* (2006.01)

(52) U.S. Cl. ............... 252/500; 252/520.3; 252/519.33; 423/34; 423/42

(58) Field of Classification Search ................ 252/500, 252/520.3, 519.33; 423/34, 42
See application file for complete search history.

(56) References Cited

FOREIGN PATENT DOCUMENTS

JP       2005-248203      *   9/2005
WO       WO 01/90226 A1   *  11/2001

OTHER PUBLICATIONS

Nikhil R. Jana et. al., Seed=Mediated Growth Approach for Shape-Controlled Synthesis of Spheroidal and Rod-Like Gold Nanoparticles Using a Surfactant Templates, MRS Bulletin, May 2005, pp. 1389-1393, vol. 13.

Benjamin Wiley et. al., Shape-Controlled Synthesis of Metal Nanostructures: The Case of Silver, Chemistry, 2005, pp. 454-463, vol. 11 (2).

Catherine J. Murphy et. al., Seed Mediated Growth Approach for Shape Controlled Synthesis of Spheroidal and Rod-Like Gold Nanoparticles Using a Surfactant Template, Advanced Materials, 2001, pp. 1389-1393, vol. 13.

H. Hoffman, Die Bestimmung Des Trubungspunkts Nichtionischer Tenside, Tenside Detergents, 1974, pp. 30-31, vol. 11.

* cited by examiner

*Primary Examiner*—Mark Kopec
*Assistant Examiner*—Jaison Thomas

(57) ABSTRACT

This invention relates to the synthesis and isolation of colloidal silver particles through the use of thermomorphic polymers and the resulting composition. It further relates to the use of the resulting composition in the preparation of inks for printing with silver-containing inks.

27 Claims, No Drawings

PREPARATION OF SILVER PARTICLES USING THERMOMORPHIC POLYMERS

FIELD OF THE INVENTION

This invention relates to processes for the synthesis and isolation of colloidal silver particles through the use of thermomorphic polymers, and compositions containing the colloidal silver particles. The invention further relates to the preparation and use of inks for printing of silver, from the colloidal silver particles prepared according to the processes disclosed herein.

BACKGROUND

Continuing miniaturization in the electronic industry is driving the features size of printed conductors smaller. To be able to print smaller conductors, the particle size of the conductive particles in inks have become smaller. In the manufacture of silver particles or colloids on a commercial scale, isolation of the dry product is an issue. There are reasonable techniques that work well for particles down to a micron, but below that isolation is difficult. A process that eases isolation would be of commercial value.

Processes known for the isolation of silver nanoparticles include filtration, centrifugation and spray drying. Filtration can become problematic or slow when the particle size is very small. Centrifugation compacts the particles into a single mass, often defeating the purpose of having made small particles. Spray drying can be an effective method of isolation if the particles will hold together resulting in no fines, but it provides no method of removing ionic byproducts.

SUMMARY OF THE INVENTION

The present invention provides processes for the preparation and isolation of colloidal silver particles by carrying out the reduction of a silver salt in the presence of an amine base and a thermomorphic polymer, wherein the thermomorphic polymer passes through its transition temperature carrying the colloidal silver articles out of suspension, thereby allowing facile isolation and washing of the product.

One aspect of the present invention is a process for preparing and isolating silver particles or colloids comprising:

a) providing, at a first temperature, a combined mixture comprising 1) a first aqueous solution of a silver(I) salt and an amine and 2) a second aqueous solution comprising a reducing agent; said combined mixture further comprising a thermomorphic polymer having a transition temperature, said thermomorphic polymer being in a homogenous phase at said first temperature; and b) changing the temperature of the combined solution from the first temperature to a second temperature at which the thermomorphic polymer is in a heterogeneous phase, such that the thermomorphic polymer and silver separate from the combined solution to form an agglomerate; and c) isolating the agglomerate from the reaction medium.

In some embodiments, the silver salt is selected from silver nitrate, silver trifluoroacetate, silver oxide and silver acetate.

In some embodiments, the silver(I) salt, the amine and the thermomorphic polymer are provided in the first solution, and the reducing agent is provided in the second solution, and the combined mixture is formed by contacting the first solution and the second solution.

In some embodiments, the silver(I) salt and the amine are provided in the first solution, and the thermomorphic polymer and the reducing agent are provided in the second solution, and the combined mixture is formed by contacting the first solution and the second solution.

In further embodiments, the silver(I) salt and the amine are provided in the first solution, the reducing agent is provided in the second solution; the first solution and the second solution are combined to form an admixture; and the admixture is contacted with the thermomorphic polymer to form the combined solution prior to changing the temperature of the combined solution from the first temperature to a second temperature at which the thermomorphic polymer is in a heterogeneous phase, such that the thermomorphic polymer and silver separate from the combined solution to form an agglomerate.

Another aspect of the present invention is silver particles prepared and isolated by the process described above.

A further aspect of the invention is a process for the preparation of silver-containing inks.

Another aspect of the invention is silver-containing ink formulations made with the silver particles produced by the processes, and processes to produce the silver inks.

A further aspect of the invention includes processes for printing using the silver-containing inks. Such processes include inkjet, screen, gravure, offset, spin, or contact printing. Printing processes can be used for printing patterns and images, particularly for semiconductor applications.

These and other aspects of the invention will be apparent to one skilled in the art in view of the following description and the appended claims.

DETAILED DESCRIPTION

Colloidal-, micron-, or submicron-sized silver particles are typically prepared on an industrial scale by the reduction of silver salts. To control the size, size distribution, morphology and other aspects of the resulting particles, a variety of agents are added to the reductions to control the precipitation of the resulting silver metal. Stabilization and isolation of the resulting silver particles is a critical aspect to the commercial technologies.

The following series of reactions represent the chemical transformations taking place during the synthesis of the colloidal silver with an aldehyde reducing agent. An aqueous solution of an amine provides a basic environment.

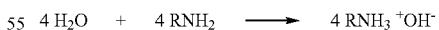

The base reacts rapidly with the silver ion precipitating silver oxide.

The presence of amine in the solution resolubilizes the silver as the diamine-stabilized silver hydroxide.

The existing basic conditions facilitate the reduction of silver(I) to silver(0) by aldehydes or other reducing agents.

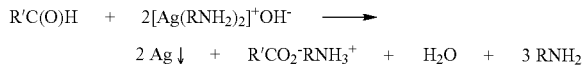

Summing the above equations gives the overall stoichiometry for the reaction.

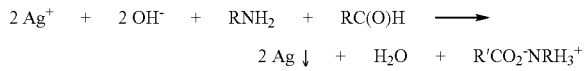

It should be noted that while there is but one alkylamine in the overall stoichiometry, a stoichiometry of two alkylamines to every silver ion is required to keep the silver in solution during the reduction process. The aldehyde reducing agent is used here for illustrative purposes, but any of a variety of reducing agents will work in this reaction.

The above paragraph described the underlying synthetic chemistry of this process, but not the role of additives that can be used to control the shape or morphology, size, size distribution, dispersability and other properties of the precipitated product. Those additives control the physical but not chemical course of the reaction by modifying particle nucleation, rates of growth of particular crystalline faces, and agglomeration of growing particles. An entire edition of the MRS Bulletin (May 2005, 30(5) and particularly the figure on page 339) describes the wide range of additives available and their applications. The additives can affect the performance properties of the many commercially-available products in the market place. The process technology described herein is directed at the isolation step and is generally independent of those additives. Nonetheless, it can impact the isolation of all of those various particle morphologies.

As used herein, the term "silver(I) salt" refers to any of a variety of compounds of silver in the plus one oxidation state. Most commonly, silver nitrate is desirable because it is the least expensive and most readily available of the silver(I) compounds. Nonetheless, silver(I) salts also include silver(I) compounds having other counterions such as acetate, carbonate, chlorate, chloride, citrate, cyanate, cyclohexanebutyrate, diethyldithiocarbamate, fluoride, hexafluorophosphate, lactate, methanesulfonate, nitrite, oxide, sulfate, tetrafluoroborate, trifluoroacetate, or trifluoromethanesulfonate. Additionally, "silver(I) salt" includes the above silver(I) salts that additionally include a ligand coordinated to the silver center. Examples of ligands that may be coordinated include amines and diamines such as methylamine, ethylenediamine, ethanolamine, diethanolamine, and diethylamine.

As used herein, the term "thermomorphic polymer" refers to a polymer that has solubility in a solvent at one temperature and undergoes a clean and rapid transition to insolubility at another temperature. For example, poly(N-isopropyl acrylamide) displays an inverse solubility in water in that it is soluble in cold water but precipitates cleanly from solution upon going through a critical transition temperature. Thus, the thermomorphic polymer/water system is monophasic when it is cold and biphasic when it is hot. The transition temperature is dependent upon a number of features including molecular weight, solvent composition, and possible comonomer incorporation.

More commonly, polymers are soluble at higher temperatures and precipitate at lower temperatures. They have phase selective solubility in thermomorphic solvent mixtures that are biphasic when cold and monophasic when hot.

As used herein, the terms "heterogeneous phase" and "homogeneous phase" refer to the thermomorphic polymer and its state relative to the aqueous solvent. "Homogeneous phase" implies that the polymer is largely in solution and the system appears homogeneous to the eye. When in the state where the polymer is a "heterogeneous phase," the polymer is not in solution, but rather, has precipitated from solution as a distinct second phase obvious to visual inspection. The terms heterogeneous phase and homogeneous phase are not intended to refer to the state of the silver, which will be in a homogeneous solution prior to reduction and a heterogeneous phase after reduction.

As used herein, the term "transition temperature" is a temperature or range of temperatures over which the solubility of the thermomorphic polymer solution undergoes a phase transition from homogeneous to heterogeneous. Polymers exhibiting either normal or inverse thermal behavior can be employed in the processes disclosed herein, so long as the transition is substantially complete and rapid. By substantially complete and rapid is meant that greater than 90 percent of the polymer precipitates from solution within a temperature range of 5° C., within the time required to effect the temperature change. The homogeneous (monophasic) range may be below or above the transition temperature depending upon the particular thermomorphic polymer chosen. For a given water/polymer system the transition temperature will be dependent upon the molecular weight of the polymer, the presence of ions or other additives in the system, and the presence of other polymers or cosolvents. The transition temperature may be determined by "cloud point" measurements well known to those skilled in the art (See for instance, H. Hoffmann, Tenside Detergents 11(1), 30-1 (1974))

When the transition through the transition temperature of the polymer occurs and the thermomorphic polymer/solvent system becomes heterogeneous in the presence of an additional heterogeneous colloidal or nanoparticle phase, the polymer phase will carry the colloid from solution into the polymer phase. This process of polymer precipitation in the presence of a heterogeneous silver phase, carrying the polymer and entrapped silver out of solution is referred to as "coagulation."

As used herein, the term "amine" refers to ammonia or a variety of alkyl amines known to associate with Ag(I) in solution. These include amines such as methylamine, dimethylamine, ethanolamine, diethanolamine, diethylamine and other related species. It also includes diamines or polyamines such as ethylenediamine, N-methylethylenediamine, N,N'-dimethylethylenediamine, and di(2-aminoethyl)amine. The purpose of the amines is twofold in that they solubilize the silver(I) by ligating the silver center under basic conditions of the reaction rather than allowing the silver to precipitate as AgO; and silver ions under basic conditions when ligated with a pair of amine ligands, $[Ag(NH_2R)_2]^+$, are more easily reduced to silver metal than unligated silver(I).

As used herein, the term "supporting polymer" means a polymer added in addition to the thermomorphic polymer to control the course of the reaction or particle morphology or size. Such control of morphology is well known to those experienced in nanoparticle formation (see for instance, Benjamin Wiley et al.; Chemistry, 11(2), 454-63 (2005)). The supporting polymer does not act as a thermomorphic component in the system. Supporting polymers are generally commercially available polymers. One or more supporting polymers can be used independently or together. The polymers may be copolymers, interpolymers or mixtures thereof. The polymers may be made from nonacidic comonomer comprising $C_1$-$C_{20}$ alkyl methacrylate, $C_1$-$C_{20}$ alkyl acrylates, styrene, acrylamide, substituted styrene, vinyl acetate, vinyl pyrrolidinone or combinations thereof. The copolymers and interpolymers may further include acidic comonomers comprising ethylenically unsaturated carboxylic acid containing moieties. The copolymer, interpolymer or mixture thereof has an acid content of between 0 and 30 weight percent of the total polymer weight. The polymers will generally have an average glass transition temperature (Tg) of 50 to 150° C. and weight average molecular weight in the range of 2,000 to 250,000 and all ranges contained therein. Typically, the supporting polymer can be a poly(acrylamide), poly(ethylene oxide) or copolymer of vinyl acetate and vinyl(pyrrolidinone). Addition of the supporting polymers can affect the size, crystallinity, morphology and agglomeration of the silver particles and therefore, their utility in end-use applications. The "supporting polymer" may be a surfactant or it may be impossible to distinguish between a surfactant and a supporting polymer because there is a continuum of molecular weights and a continuum of surface-active properties between the two extremes. Nonetheless, both supporting polymers and surfactants can be present during the process.

As used herein, the term "surfactant" means a molecule added to any step in the process to control the course or outcome of the reaction or the material properties of the product. Addition of surfactants can have an effect on the size, crystallinity, morphology and particularly the agglomeration and dispersability or redispersability of the silver particles and therefore, their utility in end-use applications. The surfactant can be used in addition to or in place of any supporting polymer in the system. The surfactants may also be referred to as dispersants, particularly when they are employed in the formulation of inks and other products. Such technology is well known to those skilled in the art, and is disclosed, for example, in Catherine J. Murphy et al., *Advanced Materials* (Weinheim, Germany) 13(18), 1389-1393, (2001) for surfactant effects on nanoparticle growth; U.S. Pat. No. 5,389,122; and PCT Int. Appl. WO 2005037464 (2005) for surfactant effects on dispersion.

The surfactants can be present in the initial production of the silver particles by reduction, or can be added subsequent to reduction. If surfactants are present in both steps, they need not be the same surfactant. Thus, for example, the surfactant cetyltrimethylammonium bromide can be present during the reduction step to control particle morphology and stearic acid can be present during particle isolation or washing to maintain the dispersability of the silver particles in subsequent end-uses.

The coated silver particles may be at least partially coated with the surfactant. The surfactant may be selected from stearic acid, palmitic acid, a salt of stearate, a salt of palmitate and mixtures thereof, and contain a counter-ion selected from hydrogen, ammonium, sodium, potassium and mixtures thereof. Additionally, the surfactant may include long-chain alkyl ammonium compounds such as cetyltrimethylammonium bromide.

If a mixture of stearic and palmitic acids or their salts are used, it is preferred that the weight percent of stearic acid or stearate be from 30 to 70 percent and the weight percent of acid in an acid salt mixture be 30 to 100 percent. The total amount of surfactant is preferably from 0.10 to 1 weight percent based on the weight of the silver particles, whether the surfactant is on the silver particles or added to the composition.

As used herein, the term "reducing agent" is any substance capable of bringing about the reduction of silver(I) to precipitated silver(0) through the donation of electrons as it itself is oxidized. It is recognized that silver ions ligated with a pair of amine ligands, $[Ag(NH_2R)_2$ are more easily reduced than unligated silver(I). Examples of organic reducing agents include resorcinol, 4-butyrolactone, furfural, manitol, 1,4-cyclohexanediol, guaicol, I-ascorbic acid, its salts and related compounds such as sodium ascorbate, d-isoascorbic acid, etc. and related compounds having a ring of the ascorbic acid type such as hydroquinone, quinone, and catechol, reducing sugars, organic hydrazines and hydroxylamines, dimethylformamide, ethylene glycol and other alcohols, and aldehydes such as formaldehyde, acetaldehyde or propionaldehyde. Formaldehyde is particularly convenient, leading to coproducts that are easily removed from the system. Inorganic reducing agents such as hydrazine, sulfite salts, formate salts, borohydride salts, $TiCl_3$, or $FeCl_2$, could also be employed. Lewis acidic reducing agents such as the Fe or Ti compounds may require modification of the amine concentration and other stoichiometries in the reaction because they can remove some amine through Lewis acid/base interactions.

The thermomorphic nature of the polymers can be utilized not only in the synthesis of the colloidal silver but also in subsequent purification. For example, after synthesis, the coagulated or agglomerated reaction mass can be re-suspended in cool water. This allows redissolution of the polymer phase and intimate contact of the silver particles with a washing medium. After an appropriate period of time, heating of the mixture will cause re-coagulation and the washing medium may be decanted or filtered. This procedure can be repeated multiple times until some predetermined criterion has been achieved. One such criterion is the conductivity of the wash water, for example, when the conductivity of the wash water falls below 10 microohms.

During the synthesis and washing procedures, it may be useful for a surfactant such as stearic acid be present. It is possible that the surfactant can be washed from the silver particles if additional surfactant is not present during the washing procedure. The desirability of the presence of the surfactant in the wash water during the washing procedure is dependent upon the envisioned end-use of the resulting silver.

When formulating silver-containing inks, the silver materials disclosed herein are dispersed in an "organic medium." The main purpose of the organic medium is to serve as a vehicle of the dispersion of the finely divided solids of the composition in such form that it can readily be applied to a ceramic, glass or other substrate. Thus, the organic medium is desirably one in which the solids are dispersible with an adequate degree of stability. Secondly, it is desirable that the organic medium has rheological properties that improve the performance of the resulting dispersion in the printing applications. Organic media for screen printing of silver inks and more particularly for screen printing of silver inks to be photoimaged are described in Glicksman (PCT Application WO03/032087 to DuPont) which is incorporated by reference herein in its entirety. Organic media for inkjet printing, particularly for inks containing high levels of silver particulate are quite different in nature and are described in copending application U.S. Ser. No. 10/775,785), which is incorporated by reference herein in its entirety.

In a typical process, an aqueous solution of the thermomorphic polymer, e.g., poly(isopropylacrylamide) and silver nitrate is combined with poly(acrylamide). Poly(isopropylacrylamide) is preferred because it has a rather clear transition temperature in water solution and it has the unusual added benefit of being insoluble above the transition temperature, as opposed to most other polymers, which are soluble at the higher temperatures and insoluble at lower temperatures. This inverse solubility behavior is of benefit during the synthesis and particularly during subsequent washing steps because the byproducts of the reaction are more soluble at the higher temperatures so their removal from the final product is more complete.

The poly(acrylamide) is added to control the morphology of the silver particles. While the poly(isopropylacrylamide) seems to play a similar role in morphology in addition to its thermomorphic role, it is not believed to be as effective as the unsubstituted poly(acrylamide). Nevertheless, it is not intended that the present invention be bound by any particular theory.

When methylamine is added to the aqueous polymer silver solution, there is an instantaneous change in pH, causing the momentary formation of a beige precipitate of basic silver oxide. The beige precipitate goes back into solution as the amine-stabilized silver cationic complex is formed. The addition of amine is preferably carried out rapidly with effective stirring. Some silver colloid formation during this step is evidenced by the discoloration of the resulting solution.

At this point, a solution of the reducing agent is added causing rapid formation of silver precipitate. An aqueous solution of formaldehyde (usually containing some residual methanol) is a convenient choice of reducing agent because the byproducts of the reaction are easily removed from the reaction medium. Hydroquinone is another possible choice of reducing agent, but it can result in the formation of an insoluble byproduct, the crystalline 1:1 charge transfer adduct of hydroquinone and quinone.

Upon addition of the reducing agent there is an immediate reaction precipitating the colloidal silver. It is possible to choose an initial reaction temperature such that the exotherm of the reduction will take the temperature of the reaction mass above the transition temperature of the thermomorphic polymer thereby spontaneously precipitating the reaction mass or coagulant. Otherwise, the reaction may be heated to cause the coagulation.

When the reaction is complete, a coagulated or agglomerated product mass forms and separates from the solution. When the mass separates from the solution it generally does so as a viscous mass. The supernatent is generally clear, the polymer having carried virtually all of the silver out of solution when it precipitated. The supernatant may be colored slightly tan but this represents a minimal loss of silver. The thermomorphic polymer is maintained at a temperature well above its transition temperature during the isolation processes because otherwise, the reaction coagulant can return to a mobile solution phase making isolation of the silver problematic. The supernatant is preferably decanted from the reaction coagulant, taking most of the reaction byproducts with it. Alternatively, the mass may be filtered.

If it is desired, further washing of the product mass is easily accomplished. The product mass may be re-suspended in an excess of fresh water at a temperature below the transition temperature of the polymer. Stirring will result in a mobile slurry of silver with most if not all of the polymer going into solution. The solution is then reheated with stirring until the polymer once again precipitates, taking the silver out of suspension. The supernatent can be decanted once again. This procedure may be repeated as many times as required to achieve the level of purity desired.

Poly(ethylene oxide)-poly(propylene oxide)-poly(ethylene oxide) (PEO-PPO-PEO) triblock copolymers such as the Pluronic® polyethers available from BASF (BASF Corporation, Mount Olive, N.J.) are desirable for use in the processes, because they have good surfactant abilities, and low toxicity. For example, aqueous solutions of Pluronic® F127 copolymers exhibit temperature-induced aggregation phenomena as a result of the hydrophobic nature of the PPO block. Gelation of concentrated Pluronic® F127 solutions occurs upon heating to temperatures at or just above ambient, making them suitable for the processes described herein.

The described process may also be carried out with thermomorphic polymers having a more conventional temperature behavior—e.g., solubility at high temperatures and insolubility at lower temperatures. In general, transitions in such polymers are more gradual than those in thermomorphic polymers, with solubility increasing as a linear function of temperature as opposed to passing through a clear transition temperature. Nonetheless, there can be considerable precipitation of polymer upon going to lower temperatures, thus immobilizing or coagulating the precipitated silver.

The silver products of the processes disclosed herein are useful for the preparation of a variety of silver inks. The methods for preparation of various inks are specific to the particular applications in which the ink will be utilized and are well known to those skilled in the art. A silver ink is composed of the silver particles and any coating or dispersing materials that result from the processes described herein, dispersed in an ink medium.

As used herein, an "ink medium" for a silver ink is all of the components of the ink other than the silver particles. These components will be specific to the printing method (inkjet, screen, gravure, offset, spin, or contact printing) by which the ink will be printed and are well known to those skilled in the art. Examples of ink media are disclosed herein below.

The ink medium of an aqueous inkjet ink composition typical of the industry and used as an example for this invention comprises a diol, a glycol ether, and water. It may further comprise a viscoelastic polymer component, an inorganic salt, and additional water-miscible solvents such as 2-pyrrolidinone. More specifically, the ink medium of a typical inkjet ink compositions preferably comprises the following concentrations, expressed as percentage of total ink medium composition not including the silver particles:

(a) 3 to 20 weight percent of at least one diol;
(b) 0 to 5 weight percent of at least one glycol ether;
(c) 0.5 to 5 weight percent of at least one component selected from surfactants, buffers, and biocides; and
(d) 0.01 to 2 percent of at least one viscoelastic polymer; and
(e) the balance water.

While the above-described medium formulation is preferred, any aqueous-based medium suitable for inkjet ink compositions may be employed in the formulation of a suitable inkjet ink. The ink medium is combined with the silver particles formed in the processes disclosed herein.

Examples of "diols" that may be employed in the preferred inkjet ink medium include any of, or a mixture of two or more of, such compounds as ethanediols (e.g., 1,2-ethanediol); propanediols (e.g., 1,2-propanediol, 1,3-propanediol, 2-ethyl2-hydroxymethyl-1,3-propanediol, ethylhydroxypropanediol (EHPD), etc.); butanediols (e.g., 1,3-butanediol, 1,4-butanediol, etc.); pentanediols (e.g., 1,5-pentanediol); and hexanediols (e.g., 1,6-hexanediol, 2,5-hexanediol, etc.). Preferably 1,5-pentanediol and EHPD are employed in the ink medium.

The "glycol ether" component of the ink medium may comprise any of the glycol ethers and thioglycols ethers, and mixtures thereof, commonly employed in inkjet ink compositions. Examples of such compounds include polyalkylene glycols such as polyethylene glycols (e.g., diethylene glycol, triethylene glycol, tetraethylene glycol, etc.) polypropylene glycols (e.g., dipropylene glycol, tripropylene glycol, tetrapropylene glycol, etc.); polymeric glycols (e.g., PEG 200, PEG 300, PEG 400, PPG 400, etc.) and thioglycol. Preferably diethylene glycol is employed in the ink medium.

Other components that may be employed in the ink medium include surfactants, buffers, and biocides, each of which are commonly employed additives in inkjet printing. Surfactants are commonly employed to prevent color to color bleed by increasing the penetration of the inks into the print medium. Any surfactants suitably employed for this purpose in inkjet ink compositions may be included in the ink medium. Examples of classes of surfactants that might be employed include anionic and nonionic surfactants.

"Buffers" can be employed in the ink medium to modulate pH. Preferred are organic-based biological buffers, since inorganic buffers can cause precipitation of the silver component in the ink composition. Further, the buffer preferably provides a pH ranging from about 6 to 9 for best results. Examples of preferred buffers include Trizma Base, which is available from, for example, Aldrich Chemical (Milwaukee, Wis.), and 4-morpholine ethane sulfonic acid (MES).

A viscoelastic polymer component is included in inkjet ink medium to prevent the formation of aerosol breakoff remnants by increasing the extensional viscosity and surface tension of the ink. "Viscoelastic polymers" suitably employed in the practice of the invention may be any such polymer that increases the extensional viscosity without affecting the sheer viscosity of the inkjet ink. Examples of classes of viscoelastic polymers include polyacrylamides, poly(ethylene oxide)s and poly(vinylpyrrolidones). A mixture of viscoelastic polymers may be employed. The viscoelastic polymers preferably have a molecular weight from about 10,000 to 5,000,000.

Consistent with the requirements of inkjet in media, various other types of additives may be employed in the ink to optimize the properties of the ink composition for specific applications. For example, as is well known to those skilled in the art, one or more biocides, fungicides, and/or slimicides (microbial agents) can be used in the ink composition as is commonly practiced in the art. Examples of microbial agents include, but are not limited to, NUOSEPT® antimicrobial (Nudex, Inc.), UCARCIDE® antimicrobial (Union Carbide), VANCIDE® antimicrobial (RT Vanderbilt Co.), and PROXEL® antimicrobial (ICI America). Additionally, sequestering agents such as EDTA may be included to eliminate deleterious effects of ionic metal impurities.

The process of "spin printing" is described in copending patent application US20050089679. An "ink medium" for a spin printing ink in its most simple form consists of a solvent such as water, in which is dissolved between 0.1 and 8 percent by weight of an ultrahigh molecular weight polymer, thereby creating a highly viscoelastic solution. An "ultrahigh molecular weight polymer," as used herein, is a polymer having a molecular weight from 1,000,000 to 20,000,000. The ink may further contain other lower molecular weight polymers (such as poly(ethyleneglycol) having a molecular weights of from 200 to 50,000) to improve the dispersion, or other solvents to control the rate of drying of the ink. The ink medium further contains from 20 to 70 percent by weight of silver particles dispersed therein. The medium may further include one or more additional components of the inkjet ink described above, such as a diol or glycol ether component, surfactants, buffers, and biocides.

The silver compositions described herein are particularly useful for photoimageable screen printing ink compositions. A photoimageable screen printing ink comprises the silver particles dispersed in a suitable ink medium. The main purpose of the ink medium is to serve as a medium for dispersion of the finely divided solids of the composition in such form that it can readily be applied to a ceramic or other substrate. Thus, the ink medium for the photoimageable screen printing ink is desirably one in which the solids are dispersible with an adequate degree of stability. Secondly, the rheological properties of the organic medium are preferably such that they provide desirable application properties to the dispersion. The main components of the ink medium are A) "polymeric binder;" B) "photohardenable monomer;" C. "photoinitiation system;" D. "organic solvent;" E) "other additives;" and F) "photospeed enhancer."

The polymeric binders are important to the compositions of photoimageable screen printing inks. They should have aqueous-developability and give a high resolving power. As used herein, a photocrosslinkable "polymeric binder" is a copolymer of nonacidic comonomers (i.e.: C1-10 alkyl acrylates or methacrylates, styrenes), and an acidic comonomer (i.e.: ethylenically unsaturated carboxylic acid) wherein 2-20 percent of the carboxylic acid is reacted with a molecule having a vinyl group and a second functional unit capable of forming a chemical bond by reaction with the carboxylic acid moiety). Examples of the vinyl group include, but are not limited to methacrylate and acrylate groups. Examples of the second functional unit include, but are not limited to epoxides, alcohols and amines. The resultant copolymer, interpolymer or mixture thereof has an acid content of at least 10 weight percent of the total polymer weight; a glass transition temperature of 50-150° C. and an weight average molecular weight in the range of 2,000-250,000.

As used herein, a "photohardenable monomer" is a monomer added to the system for the purpose of undergoing photochemically initiated free radical polymerization to increase the rigidity of the resulting system. Conventional photohardenable methacrylate monomers can be used in a photoimageable screen printing ink formulation. Depending on the application, it is not always necessary to include a monomer when using the photocrosslinkable polymer. Monomer components are present in amounts of 1-20 weight percent, based on the total weight of the dry photopolymerizable layer. Preferred monomers are disclosed in U.S. Pat. No. 3,380,831 and U.S. Pat. No. 2,927,022.

As used herein, a "photoinitiator is a compound that, in response to actinic radiation, generates free radicals that initiate a free radical polymerization within the photoexposed areas. Suitable photoinitiators for photoimageable screen printing inks are those that generate free radicals upon exposure to actinic light at ambient temperature. These include the substituted or unsubstituted polynuclear quinones, e.g., 2,2-dimethoxy-2-phenylacetophenone, 9,10-anthraquinone, 2-methylanthraquinone, or 2-tert-butylanthraquinone. Other photoinitiators that are also useful are described in U.S. Pat. No. 2,760,863. Photoreducible dyes and reducing agents disclosed in U.S. Pat. Nos. 2,850,445, 2,875,047, 3,097,096, 3,074,974, 3,097,097 and 3,145,104 find utility as do the related compounds described in U.S. Pat. Nos. 3,427,161, 3,479,185, and 3,549,367. Also useful with photoinitiators and photoinhibitors are sensitizers disclosed in U.S. Pat. No. 4,162,162.

The "organic solvent" component of the ink medium for photoimageable screen printing inks, which may be a mixture of solvents, is chosen so as to obtain substantially complete solution therein of the polymer and other organic components. The solvent is preferably inert (non-reactive) towards the other components of the composition. For screen printable and photoimageable pastes, the solvent(s) should have sufficiently high volatility to enable the solvent to be evaporated from the printed image. Typical examples are 2,2,4-trimethyl-1,3-pentanediol monoisobutyrate and terpineol both available from Aldrich (St. Louis).

As used herein, the term, "other additives" includes those other substances commonly added to screen printing ink systems for the sake of improving the performance of the ink. These components, known to those skilled in the art may, include dispersants, stabilizers, release, agents, dispersing agents, stripping agents, and antifoaming agents. Examples of suitable materials are disclosed in U.S. Pat. No. 5,049,480.

Frequently the ink medium for photoimageable screen printing inks contains one or more plasticizers if additional film softness is needed. Such plasticizers help to assure good lamination to substrates and enhance the developability of unexposed areas of the composition.

A "photospeed enhancer" is a material added to the ink medium for photoimageable screen printing inks to increase the effectiveness of radicals generated for polymerization. Examples of photospeed enhancers include stearic acid, palmitic acid, salts of stearate, and salts of palmitate, wherein the counter-ion can be ammonium, sodium and potassium or mixtures thereof.

EXAMPLES

The following examples illustrate the embodiments of the invention that are presently best known. However, it is to be understood that the following arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, the present invention has been described above with particularity and the following Examples provide further detail in connection with what are presently deemed to be the most practical and preferred embodiments of the invention. Nonetheless, it will be apparent to those skilled in the art that numerous modifications, including, but not limited to, variations in size, materials, shape, form, function and manner of operation, assembly and use may be made without departing from the principles and concepts set forth herein.

The purity of all components used in the following examples is that found in common commercial practice.

Some polymers were from Scientific Polymer Products, which is located in Ontario, N.Y. Most other materials were from Aldrich Chemical located in St. Louis, Mo. The roller mill employed was by U.S. Stoneware Corp., Palestine Ohio) and was set on its lowest speed.

Example 1

Preparation of Silver with poly(N-isopropyl acrylamide)

An aqueous solution of poly(isopropylacrylamide) (1.25 g, Scientific Polymer Products, MW=300,000) in deionized water (100 mL) was prepared on a roller mill. Silver nitrate (Aldrich) was introduced to the polymer solution by dissolving 16.99 g (0.10 mol, MW=169.88) of silver nitrate. This mixture was stirred until all had gone into solution. To this was added methylamine (20 mL, Aldrich, 40 percent aqueous solution, 17.94 g, 0.231 mol) with rapid stirring. There was an immediate precipitation of a tan material that rapidly went back into solution giving a relatively clear, beige solution.

A solution of the formaldehyde (20 mL, Aldrich 37 percent aqueous solution containing methanol, 18.34 g, 0.224 mol) was diluted to 100 mL with water. The solution was quickly added to the silver methylamine solution. There was an immediate reaction precipitating silver and then the reaction mass separated from the solution as a viscous, low-density mass. The precipitation was probably the result of the reaction exotherm taking to polymer solution temperature above the point where the polymer precipitated. The supernatent was clear and colored slightly tan. It was decanted from the reaction mixture.

The reaction mass was re-suspended in 100 mL of cool water. With stirring it became a mobile slurry with most if not all of the polymer going into solution. The solution was then heated in a water bath with stirring until the polymer once again precipitated, taking the silver out of suspension. The supernatant was carefully decanted leaving beige mass. This procedure was repeated two more times, washing the product with deionized water each time.

Example 2

Preparation with poly(N-isopropyl acrylamide)

To an aqueous solution of 20.0 mL polyacrylamide (50 percent water solution of molecular weigh 1500) in deionized water (100 mL) in a glass bottle was added poly (isopropylacrylamide) (1.25 g, Scientific Polymer Products, MW=300,000) and the resulting suspension was placed on a roller mill for 24 hours. The polymer did not go into solution and another 100 mL of water was added to the bottle. Further roller-milling (24 hr) still did not give a solution. Silver nitrate was introduced to the polymer solution by dissolving 16.99 g (0.10 mol, MW=169.88) of silver nitrate. The suspension whitened and the poly(isopropylacrylamide) still did not go into solution. This mixture was added slowly to a solution of methylamine (20 mL, Aldrich 40 percent aqueous solution, 17.94 g, 0.231 mol) with rapid stirring. There was an immediate precipitation of a tan material that rapidly went back into solution giving a relatively beige suspension.

A solution of the formaldehyde (20 mL, Aldrich 37 percent aqueous solution containing methanol, 18.34 g, 0.224 mol) was diluted with water (100 mL) in a plastic beaker. The silver methylamine solution was quickly added to the formaldehyde solution. There was a slow reaction that turned reddish and dark. The suspension was stirred for an hour.

Heating the suspension to 50° C. caused the reaction mass to separate from the solution as a viscous, low-density material. It was easily isolated by decantation. The supernatent was dark red-black. Centrifugation of the supernatent yielded a very small quantity of silver and the supernatent from the centrifugation remained the dark red-black.

The reaction mass was re-suspended in 100 mL of cool water. With stirring it became a mobile slurry with most if not all of the polymer going into solution. The solution was then heated in a water bath with stirring until the polymer once again precipitated, taking the silver out of suspension. The supernatent was carefully decanted leaving dark mass. This procedure was repeated one more time, washing the product with deionized. This was substantially all of the silver from the reaction. Electron microscopy of the particles showed that there were primary particles in the range of 100 nm and they appeared to be single-crystalline.

Example 3

Control with no poly(acrylamide)

As a Control for example 2, the experiment was repeated without the supporting polymer, poly(acrylamide) to control the particle size.

To deionized water (100 mL) in a glass bottle was added poly(N-isopropylacrylamide) (1.25 g, Scientific Polymer Products, MW=300,000) and the resulting suspension was placed on a roller mill for 24 hours. The polymer did not go completely into solution and another 100 mL of water was added to the bottle. Further roller-milling (24 hr) gave a solution. Silver nitrate was introduced to the polymer solution by dissolving 16.99 g (0.10 mol, MW=169.88) of silver nitrate. There was no color change. This mixture was added slowly to a solution of methylamine (20 mL, Aldrich 40 percent aqueous solution, 17.94 g, 0.231 mol) with rapid stirring. There was an immediate precipitation of a tan material that rapidly went back into solution giving a relatively clear, beige solution.

A solution of the formaldehyde (20 mL, Aldrich 37 percent aqueous solution containing methanol, 18.34 g, 0.224 mol) was diluted with water (100 mL). The silver methylamine solution was quickly added to the formaldehyde solution in a plastic beaker. There was a rapid reaction that evolved gas and rapidly turned black. A porous black polymer mass floated to the top of the reaction. The suspension was stirred for an hour and the black mass remained on the top. Intense stirring was able to break it up slightly.

Heating the suspension to 50° C. caused the reaction mass to separate cleanly from the solution as a viscous, low-density material that floated on top of the reaction solution. It was easily isolated by decantation. The supernatent was relatively dark tan. Centrifugation of the supernatent yielded a very small quantity of silver and the supernatent from the centrifugation remained the tan.

The reaction mass was re-suspended in 100 mL of cool water. With stirring it became a mobile slurry with most if not all of the polymer going into solution. The solution was then heated in a water bath with stirring until the polymer once again precipitated, taking the silver out of suspension. This time the mass was more dense than the solution and was at the bottom of the container. The supernatent was carefully decanted leaving dark mass. This procedure was repeated one more time, washing the product with deionized. This was substantially all of the silver from the reaction. Electron microscopy of the particles showed that they were agglomerated spheres in the 500 nm range though those spheres could contain smaller particles.

Example 4

Control with no poly(isopropylacrylamide)

As a control for Example 2, the process was carried out without the thermomorphic poly(N-isopropylacrylamide).

An aqueous solution of 20.0 mL polyacrylamide (50 percent water solution of molecular weight 1500) was mixed with deionized water (100 mL) in a glass bottle and the resulting solution was placed on a roller mill for 24 hours. Another 100 mL of water was added to the bottle and roller-milling was continued another 24 hr. Silver nitrate was introduced to the polymer solution by dissolving 16.99 g (0.10 mol, MW=169.88) of silver nitrate. The suspension whitened. This mixture was added slowly to a solution of methylamine (20 mL, Aldrich 40 percent aqueous solution, 17.94 g, 0.231 mol) with rapid stirring. There was an immediate precipitation of a tan material that rapidly went back into solution giving a beige suspension.

A solution of the formaldehyde (20 mL, Aldrich 37 percent aqueous solution containing methanol, 18.34 g, 0.224 mol) was diluted with water (100 mL). The silver methylamine solution was quickly added to the formaldehyde solution. There was a slow reaction that turned reddish and dark. The reaction may have been slightly faster than that of 101. The suspension was stirred for an hour.

Heating the suspension to 50° C. resulted in no change. The liquid remained dark red-black and it was not possible to carry out any separation. Isolation could not be accomplished by decantation or filtration. Centrifugation of the suspension yielded the expected quantity of silver and the supernatent from the centrifugation remained the dark red-black.

The reaction mass was re-suspended in 100 mL of water. With stirring it became a somewhat mobile slurry. The suspension was then heated in a water bath with stirring to no effect. The suspension was once more centrifuged to isolate the solids. Electron microscopy of the particles showed that the primary particles were in the range of 100 nm and they appeared to be single-crystalline, but they were massed together by the isolation process and could not be readily redispersed.

Example 5

Modification of Order of Addition

As an improvement for Example 2 the order of addition of the reagents was changed, yielding a more scalable process.

A suspension of poly(isopropylacrylamide) (1.25 g, Scientific Polymer Products, MW=300,000) in water (200 mL) was prepared in a glass bottle and the resulting suspension was placed on a roller mill for 48 hours. A clear solution was obtained. To that solution was added an aqueous solution of 20.0 mL polyacrylamide (50 percent water solution of molecular weigh 1500). The solution remained relatively clear though there was a slight change. Thus the order of addition of the two polymers makes a difference when making a solution. Silver nitrate was introduced to the polymer solution by dissolving 16.99 g (0.10 mol, MW=169.88) of silver nitrate. The suspension whitened like thew other reactions in which polyacrylamide was present. This mixture was added slowly to a solution of methylamine (20 mL, Aldrich 40 percent aqueous solution, 17.94 g, 0.231 mol) with rapid stirring. There was an immediate precipitation of a tan material that rapidly went back into solution giving a relatively beige suspension.

A solution of the formaldehyde (20 mL, Aldrich 37 percent aqueous solution containing methanol, 18.34 g, 0.224 mol) was diluted with water (100 mL) in a plastic beaker. The silver methylamine solution was quickly added to the formaldehyde solution. There was a slow reaction that turned reddish and dark. The suspension was stirred for an hour.

Heating the suspension to 50° C. caused the reaction mass to separate from the solution as a viscous, low-density material. It was easily isolated by decantation. The supernatent was dark red-black. Centrifugation of the supernatent yielded a very small quantity of silver (E105129-104A) and the supernatent from the centrifugation remained the dark red-black.

The reaction mass was re-suspended in 100 mL of cool water. With stirring it became a mobile slurry with most if not all of the polymer going into solution. The solution was then heated in a water bath with stirring until the polymer once again precipitated, taking the silver out of suspension. The supernatent was carefully decanted leaving dark mass. This procedure was repeated one more time, washing the product with deionized water. This was substantially all of the silver from the reaction.

This overall reaction was very much like 101 other than the fact that the poly(isopropylacrylamide) in 101 was very non-homogeneous. Electron microscopy of the particles showed that there were primary particles in the range of 100 nm and they appeared to be single-crystalline but they were totally surrounded by polymer.

Example 6

Formulation of a Screen Printing Ink

Preparation of the media: The solvent Texanol® (Union Carbide)(11 g) and acrylic polymers PVPNA S-630 (a copolymer of 60 percent vinylpyrrolidone and 40 percent vinyl acetate. K-value=30-50 (ISP Technologies, Inc., Wayne, N.J.))(0.3 g) and Carboset XPD1234, a copylymer of 80 percent methyl methacrylate and 20 percent methacrylic acid, average weight molecular weight Mw=6,000, acid number=120 (B. F. Goodrich)) (7.2 g) were mixed and heated with stirring to 80° C. Heating and stirring was continued until the acrylic polymer had dissolved. The solution was then allowed to cool.

A glass frit available from DuPont (Wilmington, Del.) had the component weight percent of the following: $SiO_2$ (9.1), $Al_2O_3$ (1.4) PbO (77.0), $B_2O_3$ (12.5).

A silver was prepared as in Example 2. After washing was completed, the damp coagulant was mixed with 0.5 weight percent stearic acid (based upon silver) and was mixed for 15 minutes. The slurry was used as is in the next step.

The silver (6.8 g based upon silver) and frit (0.2 g) were then added to 2 g of the organic medium mixture. The total composition was then mixed thoroughly. The mixture was then further wetted with an additional 0.3 g of Taxanol® and mulled on a Hoover Automatic Muller, Model M5.

The resulting ink was suitable for screen printing. Care should be taken to avoid dirt contamination in the process of preparing paste compositions and in preparing parts, since such contamination can lead to defects. The paste can be applied to a glass substrate by screen-printing using 325 mesh screens. Addition of a photoinitiating package and a photopolymerizing polymer system would have made the ink photodevelopable.

Example 7

Formulation of an Inkjet Ink

A silver sample was prepared as in Example 2. The sample was washed three times by redissolving in fresh deionized water containing 0.5 percent stearic acid and then heating to a temperature above the thermomorphic transition to reprecipitate the solid coagulant. After washing was completed, the coagulant mixture (4.0 g based upon silver) was mixed with de-ionized water (4.0 g) and 0.5 weight percent stearic acid (based upon silver) was added to the slurry as a coating material. Mixing was continued for 15 minutes.

The stearate-treated coagulant was combined with Dowanol®-DB (Dow Chemical, Midland Mich.) (2 g), cetyltrimethylammonium bromide (Aldrich) (0.2 g), Igepal CA-210 (Aldrich) (0.3 g), and Solsperse 44000 (Avecia, Manchester, UK). Water was added until the total weight was 10 g. The sample was then ultrasonically dispersed for 30 min (Branson Ultrasonics, Danbury Conn., Digital Sonifier with a CE converter set at power level 4) with an ice/water bath for cooling.

The resulting ink was suitable for inkjet printing.

What is claimed is:

1. A process for preparing and isolating silver particles or colloids comprising:
    a) providing, at a first temperature, a combined mixture comprising 1) a first aqueous solution of a silver(I) salt and an amine and 2) a second aqueous solution comprising a reducing agent; said combined mixture further comprising a thermomorphic polymer having a transition temperature, said thermomorphic polymer being in a homogenous phase at said first temperature; and
    b) changing the temperature of the combined solution from the first temperature to a second temperature at which the thermomorphic polymer is in a heterogeneous phase, such that the thermomorphic polymer and silver separate from the combined solution to form an agglomerate; and
    c) isolating the agglomerate from the reaction medium wherein the isolation is by decantation or filtration.

2. The process of claim 1 wherein said silver(I) salt, said amine and said thermomorphic polymer are provided in said first solution, and said reducing agent is provided in said second solution, and said combined mixture is formed by contacting the first solution and the second solution.

3. The process of claim 1 wherein said silver(I) salt and said amine are provided in said first solution, and said thermomorphic polymer and said reducing agent are provided in said second solution, and said combined mixture is formed by contacting the first solution and the second solution.

4. The process of claim 1 wherein said silver(I) salt and said amine are provided in a first solution, and said reducing agent is provided in a second solution; said first solution and said second solution are combined to form an admixture; and said admixture is contacted with said thermomorphic polymer to form said combined solution prior to changing the temperature of the combined solution from the first temperature to a second temperature at which the thermomorphic polymer is in a heterogeneous phase.

5. The process of claim 1 wherein the first or second aqueous solution also comprises one or materials selected from supporting polymers and surfactants.

6. The process of claim 1, further comprising washing the agglomerate by:
   a) redissolving the agglomerate in a fresh aqueous washing medium at a temperature that is on the homogeneous phase side of the transition temperature of said thermomorphic polymer, to form a solution;
   b) changing the temperature of the solution through the transition temperature of the thermomorphic polymer to a temperature at which the thermomorphic polymer solution is in its heterogeneous phase causing the silver particles and thermomorphic polymer to reform an agglomerate; and
   c) re-isolating the agglomerate from the aqueous washing medium.

7. The process of claim 6 wherein the washing medium comprises a surfactant.

8. The process of claim 1 wherein the silver salt is silver nitrate, silver trifluoroacetate, silver oxide or silver acetate.

9. The process of claim 1 wherein the reducing agent is one or more compounds selected from: formaldehyde, hydroquinone, ascorbic acid, reducing sugars, hydrazines, hydroxylamines, dimethylformamide, ethylene glycol, and aldehydes.

10. The process of claim 1 wherein the amine is selected from methylamine, ethylamine, ethanolamine, ethylenediamine, dimethylamine, and diethanolamine.

11. The process of claim 1 wherein the thermomorphic polymer is poly(isopropylacrylamide).

12. The process of claim 1 wherein the silver salt is silver nitrate, the reducing agent is formaldehyde, the amine is methylamine, and the thermomorphic polymer is poly(isopropylacrylamide).

13. The process of claim 1 wherein the supporting polymer is polyacrylamide or poly(isopropylacrylamide) or a combination thereof.

14. A process of preparing a silver ink comprising:
   a) providing, at a first temperature, a combined mixture comprising 1) an aqueous solution of a silver(I) salt and an amine and 2) a second aqueous solution comprising a reducing agent; said combined mixture further comprising a thermomorphic polymer having a transition temperature, said thermomorphic polymer being in a homogenous phase at said first temperature; and
   b) changing the temperature of the combined solution from the first temperature to a second temperature at which the thermomorphic polymer is in a heterogeneous phase, such that the thermomorphic polymer and silver separate from the combined solution to form an agglomerate; and
   c) isolating the agglomerate wherein the isolation is by decantation or filtration; and
   d) dispersing said agglomerate in an ink medium.

15. The process of claim 14 wherein said silver(I) salt, said amine and said thermomorphic polymer are provided in said first solution, and said reducing agent is provided in said second solution, and said combined mixture is formed by contacting the first solution and the second solution.

16. The process of claim 14 wherein said silver(I) salt and said amine are provided in a first solution, and said thermomorphic polymer and said reducing agent are provided in a second solution, and said combined mixture is formed by contacting the first solution and the second solution.

17. The process of claim 14 wherein said silver(I) salt and said amine are provided in a first solution, and said reducing agent is provided in a second solution; said first solution and said second solution are combined to form an admixture; and said admixture is contacted with a said thermomorphic polymer to form said mixture prior to changing the temperature of the combined solution from the first temperature to a second temperature at which the thermomorphic polymer is in a heterogeneous phase.

18. The process of claim 14 wherein the first or second aqueous solution also comprises one or more materials selected from supporting polymers and surfactants.

19. The process of claim 14, further comprising washing the polymer/silver agglomerate prior to the step of dispersing the product in an ink medium by:
   a) redissolving the agglomerate in a fresh aqueous washing medium at a temperature that is on the homogeneous phase side of the transition temperature of said thermomorphic polymer to form a solution;
   b) changing the temperature of the solution through the transition temperature of the thermomorphic polymer to a temperature at which the thermomorphic polymer solution is in its heterogeneous phase causing the silver particles and thermomorphic polymer to reform an agglomerate; and
   c) re-isolating the agglomerate from the aqueous washing medium.

20. The process of claim 19 wherein the washing medium comprises a surfactant.

21. The process of claim 14 wherein the silver salt is silver nitrate, silver trifluoroacetate, silver oxide or silver acetate.

22. The process of claim 14 wherein the reducing agent is one or more compounds selected from formaldehyde, hydroquinone, ascorbic acid, reducing sugars, hydrazines, hydroxylamines, dimethylformamide, ethylene glycol, and aldehydes.

23. The process of claim 14 wherein the amine is selected from methylamine, ethylamine, ethanolamine, ethylenediamine, dimethylamine, and diethanolamine.

24. The process of claim 14 wherein the thermomorphic polymer is poly(isopropylacrylamide).

25. The process of claim 14 wherein the silver salt is silver nitrate, the reducing agent is formaldehyde, the amine is methylamine, and the thermomorphic polymer is poly(isopropylacrylamide).

26. The process of claim 14 wherein the supporting polymer is polyacrylamide or poly(isopropylacrylamide) or a combination thereof.

27. The process of claim 14 wherein the ink is for inkjet, screen, gravure, offset, spin, or contact printing.

* * * * *